United States Patent Office 3,459,514
Patented Aug. 5, 1969

3,459,514
METHOD FOR PREPARING ALKALI METAL BOROHYDRIDES
James D. Johnston and Albert P. Giraitis, Baton Rouge, La., assignors to Ethyl Corporation, New York, N.Y., a corporation of Virginia
No Drawing. Continuation-in-part of applications Ser. No. 308,691, Sept. 13, 1963, and Ser. No. 322,054, Nov. 7, 1963. This application Oct. 1, 1964, Ser. No. 400,888
Int. Cl. C01b 6/14
U.S. Cl. 23—362           6 Claims

ABSTRACT OF THE DISCLOSURE

A method of preparing alkali metal borohydrides comprising reacting an alkali metal or alkali metal hydride, desiccated borax, hydrogen, and silicon, in an inert hydrocarbon at about 250° C. to 500° C. and 15 to 500 p.s.i.

---

The present invention relates to a new process for the production of alkali metal borohydrides.

This application is a continuation in part of our copending applications Ser. No. 308,691 (filed Sept. 13, 1963) and Ser. No. 322,054 (filed Nov. 7, 1963), now abandoned of the same title.

A large number of publications have described the production of boranates or alkali metal borohydrides in which the starting materials include boron halides, boron halide complexes, organic boron compounds, or boric acid. All of these materials are either expensive, dangerous to handle or result in low yields of the desired product.

One typical method of producing alkali metal borohydrides is set forth in U.S. Patent 2,461,661, issued on Feb. 15, 1949 to Schlesinger et al. This method comprises reacting an alkali metal alkoxyborohydride and diborane in accordance with the following equation:

$$2\text{MeBH}(\text{OR})_3 + \text{B}_2\text{H}_6 \rightarrow 2\text{MeBH}_4 + 2\text{B}(\text{OR})_3$$

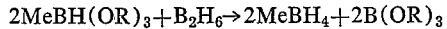

wherein Me is an alkali metal and R is a hydrocarbon radical. The reaction materials required in this process are extremely expensive which consitutes a definite disadvantage.

More recently, U.S. Patent 3,077,376, which issued on Feb. 12, 1963 to Schubert et al., describes a method of preparing alkali metal borohydrides by reacting borax, sodium and hydrogen in the presence of substances such as silica which react chemically with the metal oxide formed. The patentees state that in order to obtain optimum results, the reactants, i.e., the borate minerals, alkali metal and hydrogen, are mixed in such proportion that for each atom of boron present in the reaction mixture, there are present at least four atoms of alkali metal and four atoms of hydrogen. Thus a typical equation exemplifying the process is as follows:

$$\text{Na}_2\text{B}_4\text{O}_7 + 16\text{Na} + 7\text{SiO}_2 + 8\text{H}_2 \rightarrow 4\text{NaBH}_4 + 7\text{Na}_2\text{SiO}_3$$

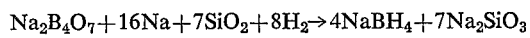

This process, although to some extent economical, utilizes excessive quantities of sodium and silica in order to obtain sodium borohydrides, e.g., 16 moles of sodium in order to obtain four moles of sodium borohydride product. Furthermore, large quantities of sodium silicate are produced as a by-product.

It is therefore an object of the present invention to provide a process for producing sodium borohydride which is more economical than prior art processes. It is another object of the present invention to employ cheap reactant materials which are readily available. It is a further object of the present invention to provide a process whereby the amount of the alkali metal reactant required is smaller than the requirements of the prior art. It is still a further object of the present invention to provide a process whereby the amount of by-product produced is less than that produced by the prior art. Other objects will become apparent from the ensuing description.

The above objects are accomplished by the provision of a process for producing an alkali metal borohydride which comprises reacting together an alkali metal hydride, desiccated borax, hydrogen, and silicon at a temperature within the range of from about 200° C. to about 900° C.

The alkali metal present during the course of the reaction is a member selected from Group I-A of the Periodic Chart of the Elements, Fisher Scientific Company, 1955. The alkali metals include lithium, sodium, potassium, rubidium, and cesium. Sodium is a preferred alkali metal from an economic standpoint and in view of the fact that sodium borohydride is a preferred product of the instant invention.

The reaction mixture can initially comprise an alkali metal either in the form of its hydride or its metallic state. Thus, the reaction mixture can comprise initially an alkali metal in the form of: lithium, sodium, potassium, rubidium, cesium, lithium hydride, sodium hydride, potassium hydride, rubidium hydride, or cesium hydride, or any mixture of such materials. Whether employing an alkali metal hydride or an alkali metal as the source of the alakali metal, the reaction should be conducted in the presence of free hydrogen for reasons as brought out hereinafter. However, when employing an alkali metal hydride the reaction can be conducted utilizing less free hydrogen since some of the necessary hydrogen values can be supplied from the alkali metal hydride. The latter approach which offers no technical advantage suffers an economic disadvantage inasmuch as excessive quantities of sodium hydride are required. It is preferred in the process of this invention to employ the alkali metal and hydrogen as separate and distinct reactants since high yields of the alkali metal borohydride are obtained in short reaction or cycle times.

A more preferred embodiment of the instant invention is the process comprising reacting together an alkali metal, desiccated borax, hydrogen, and silicon at a temperature within the range of from about 200° C. to about 900 C. An even more preferred embodiment is a process for producing sodium borohydride which comprises reacting together sodium, desiccated borax, hydrogen, and silicon at a temperature within the range of from about 200° C. to about 900° C.

A more preferred temperature range, especially when utilizing sodium metal as a reactant, is within the range of from about 350° C to about 600° C.

The present process is preferably conducted at superatmospheric pressure, even though atmospheric pressure or less can be employed, the pressure being influenced mainly by the nature of the reactants as well as the type of reaction equipment employed. The partial pressure of hydrogen can range from about 5 p.s.i. to about 3000 p.s.i., preferably from about 15 p.s.i. to about 1000 p.s.i. The total pressure in the system should normally be from 0 to about 500 p.s.i. higher than the hydrogen partial pressure, depending on the nature of the inert liquid medium and the concentration of inert gaseous diluents, such as nitrogen, neon, argon, krypton, and the like, which may be present.

The borax starting material referred to hereinabove is desiccated or dehydrated borax having the formula $\text{Na}_2\text{B}_4\text{O}_7$. This material is obtained by heating the borax or tinkal, $\text{Na}_2\text{B}_4\text{H}_7 \cdot 10\text{H}_2\text{O}$ to a temperature sufficient to drive the water from the naturally occurring mineral. In some instances it may be more desirable to employ other borate minerals as the starting materials. In such cases borate minerals such as kernite, colemanite, boronatrocalcite, ulexite, boracite, and mixtures thereof can be employed. However, it is much preferred to employ desiccated borax in the process of this invention since it is readily available and hence offers a cost advantage.

The element silicon in its pure form is preferably employed as the co-reductant in the process of this invention. However, if desired ferrosilicon can be employed in place of silicon. Ferrosilicon is readily available on the commercial market at a rather economical price.

A particularly preferred embodiment of this invention is to conduct the present process in a diluent which is inert to the reactants and the reaction products. The diluent is beneficial inasmuch as it inhibits caking of the reaction mass as well as aids in the maintenance of constant temperatures. A diluent which is liquid at the temperature and pressure employed is most preferred. Suitable diluents are aliphatic hydrocarbons, aromatic hydrocarbons, silicones, and the like. The aliphatic hydrocarbons are most preferred, especially mineral oils and oils having a similar boiling point, viz. from about 300° C. to about 500° C. Other specific examples of the foregoing diluents are set forth hereinafter. The solid reactants are generally present in an amount within the range of from about 5 to about 35, especially from about 15 to about 30, percent on a weight basis.

When employing a diluent, the present process is preferably conducted at a temperature within the range of from about 350 to about 500° C., especially from about 400 to about 450° C., and at a pressure within the range of from about 200 to about 1000 p.s.i., especially from about 300 to about 600 p.s.i. Under these conditions the best yield in the shortest reaction time is realized. In fact, yields exceeding 90 percent are easily realized in less than 15 minutes and quite often is less than 10 minutes pursuant to this embodiment.

A more particularly preferred embodiment of the instant invention is a process which comprises reacting together an alkali metal hydride, hydrogen, desiccated borax, and silicon in a liquid diluent at a temperature within the range of from about 350 to about 500° C. and at a pressure within the range of from about 200 to about 1000 p.s.i.

Yields are maximized when the solid reactants, namely the alkali metal or alkali metal hydride, desiccated borax, and silicon, are ground to a pulverulent state before being reacted. It can be appreciated that this feature does not necessitate a separate step when employing a ballmill reactor since the reactants are comminuted in situ. The reactants can be previously mixed and then ground or individually ground and then mixed. It has been found that the size of the silicon reactant influences the results to a greater extent than the size of the other reactants and hence, it is especially prefererd to at least have the silicon present in a fine state of aggregation. The reactants are generally ground to an average particle size less than about 50 microns, preferably below 10 microns and especially in the case of the silicon reactant which is often reduced to an average particle size less than 5 microns.

An even more particularly preferred embodiment of this invention is a process which comprises reacting together an alkali metal, hydrogen, desiccated borax, and silicon in a liquid diluent present in an amount within the range of from about 65 to about 95 percent on a weight basis, said alkali metal and silicon being in excess of the stoichiometric proportions and said reaction being conducted at a temperature within the range of from about 350 to about 500° C. and at a pressure within the range of from about 200 to about 100 p.s.i., said silicon being of an average particle size less than about 5 microns.

The amount of alkali metal reactant which is employed in the process of this invention can vary over a wide range. Generally from about 0.5 atom to about 4 atoms of alkali metal (in the form of alkali metal or alkali metal hydride) per atom of boron is employed. It is preferred, however, that from about 1.5 atoms to about 3 atoms of alkali metal per atom of boron be employed since yields are maximized within this range. When employing a diluent it is preferred to use an excess of sodium above the stoichiometric proportions, generally from about 10 to about 60 percent in excess, or from about 1.83 to about 2.66 atoms of sodium per atom of boron.

The amount of silicon employed can also vary over a wide range. Generally, from about 0.2 atom to about 1.5 atoms of silicon per atom of boron is employed in the process of this invention. It is preferred, however, in order to maximize yields, that an excess of silicon above the stoichiometric proportions be used, e.g. above about 0.6 atom of silicon per atom of boron to as much as 64 atoms of silicon per atom of boron (about 1000 percent excess). When employing a diluent, it is particularly preferred to have an excess of from about 20 to about 80 percent or from about 0.7 to about 1.05 atoms of silicon per atom of boron.

The amount of hydrogen employed in this process will generally be in excess of the stoichiometric amount which is about 2 atoms of hydrogen per atom of boron because yields are maximized under this condition. Moreover, it is more expeditious to operate in such a manner, especially when employing hydrogen also as a pressurizing medium which as brought out above is an optimum mode of operating.

The process of this invention is not to be confused with certain processes heretofore set forth in the art. In U.S. Patent 3,077,376, the patentees teach the use of silica ($SiO_2$) as a substance which will react chemically with metal oxides formed in the reaction between borax, sodium and hydrogen. Although the specific reaction mechanism is not known, it is believed, on the basis of all available chemical evidence, that sodium oxide is formed, which then reacts with the silica, as in the following set of equations:

$$Na_2O + SiO_2 \rightarrow Na_2SiO_3$$
$$Na_2B_4O_7 + Na \rightarrow Na_2O$$

In sharp contrast to the invention in U.S. Patent 3,077,376, the process of this invention employs silicon (Si) as a co-reductant with the alkali metal. This creates many advantages in the presently claimed process. The unique process of this invention produces only ⅓ as much sodium silicate by-product as the prior art invention. Furthermore, the sodium requirements are considerably less for this invention than the prior art, hence giving a substantial raw material saving. Moreover, the present process results in more efficient utilization of reaction equipment, i.e., greater production of the desired borohydride product per unit volume of reaction zone—than the prior art process.

The process of this invention is adaptable to a wide variety of processing techniques such as a batch process or a continuous process.

The batch process is generally conducted in a ballmill equipped with a means of heating and cooling to produce the desired temperature. The reactants are placed in the mil, and the mill is pressured with hydrogen. The product is then cooled and recovered by selective solvent extraction or other means. The ballmill provides an excellent means for mixing and grinding the reactants to finely divided form.

The batch process can also be conducted in an autoclave equipped with paddle or turbine type stirrers or plows. The reactants are charged into the autoclave and then pressured with hydrogen. The temperature of the autoclave is then raised to the desired level and the reactants are mixed and stirred. The reaction products are then washed from the autoclave and piped, for example, to filtration towers for separation.

The continuous process can be conducted in a variety of equipment by a number of techniques. One such method for a continuous process involves a rod mill where the reactants are fed into one end with continuous mixing and grinding and continuously withdrawn from the other end of the mill. Parallel sets of ball mills can also be employed where the reactants are fed into one mill with mixing and grinding, while in the other mill the reaction products are being discharged.

Another such method for a continuous process involves an autoclave equipped with paddle or turbine type stirrers or plows. The reactants are fed to the reactor with continuous mixing and stirring and the poducts are continously discharged.

The statements above are not intended in any way to limit this invention to precise engineering techniques or specific types of equipment. It should be understood, however, that the process of this invention can utilize other techniques and equipment variations without departing from the true spirit and scope hereof.

The process of this invention will be better understood by the following working examples in which all parts are by weight unless otherwise stated.

Example I

Desiccated borax (27.1 parts) was mixed in a ball-mill with 20.3 parts of sodium and 8.6 parts of silicon. The ballmill was then pressured to 50 p.s.i. with hydrogen and the temperature was raised to 500° C. Reaction mixture was mixed and ground for a period of 3 hours and thereafter cooled. The resulting reaction mixture was separated by solubilizing the mixture in 200 parts of the dimethyl ether of diethylene glycol. The solution was filtered to remove impurities. The resulting liquid product was subjected to evaporation to obtain sodium borohydride (etherate) in 61 percent yield.

When the resulting liquid product obtained as above is heated to about 100° C., pure white crystalline $NaBH_4$ is realized in similar yield.

Equally excellent results are obtained when lithium, potassium, rubidium or cesium are employed in place of sodium to produce the corresponding borohydride.

Example II

Desiccated borax (27 parts) was mixed in a ball mill with 22 parts of sodium hydride and 9.5 parts of silicon. The ball mill was then pressured to 50 p.s.i. with hydrogen and the temperature was raised to 250–275° C. for one-half hour with mixing and grinding. The temperature was then raised to 350° C. for one-half hour with continuous mixing and grinding. At the end of one-half hour, temperature was raised to 400–450° C. for 3½ hours, at the end of which time the temperature was raised to 500° C. for one hour and 15 minutes. During this reaction time mixing and grinding was continuous. The resulting reaction mixture was cooled and separated by solubilizing the mixture in 150 parts of the dimethyl ether of diethylene glycol. The solution was then filtered to remove impurities. The resulting liquid product was subjected to evaporation to obtain sodium borohydride in the etherate state in a 38.5 percent yield.

Example III

Desiccated borax (27 parts) was mixed in a ball mill with 22 parts of sodium hydride and 9.5 parts of silicon. The ball mill was then pressured to 50 p.s.i. with hydrogen and the temperature was raised to 498 to 525° C. with mixing and grinding for a period of 3 hours. The resulting reaction mixture was separated by the same method as set forth in Example I. The sodium borohydride was recovered as an etherate in a 49 percent yield.

When the resulting liquid product obtained as above is heated to about 100° C., pure white crystalline $NaBH_4$ is realized in similar yield.

Example IV

Desiccated borax (54.2 parts) was mixed in a ball mill with 45 parts of sodium hydride and 19 parts of silicon. The ball mill was then pressured to 47 p.s.i. with hydrogen. The reaction mixture was milled for 1 hour after which the temperature was raised to 500° C. for 3 hours. The reaction mixture was separated by solubilizing the sodium hydride product in 400 parts of the dimethyl ether of diethylene glycol. The resulting solution was filtered to remove the impurities and the liquid product was subjected to evaporation to obtain sodium borohydride in a 36 percent yield.

Substitution of ulexite for borax in the above run which is conducted at 1,000 p.s.i. and 600° C. for a period of 1 hour achieves similar results.

Example V

Desiccated borax (27.1 parts) was mixed in a ball mill with 22.2 parts of sodium hydride and 9.5 parts of silicon. The ball mill was then pressurized to 47 p.s.i. and the mixture was milled for 15 hours. The temperature was then raised to 500° C. and milled for 3 hours. The resulting reaction mixture was treated in the same manner as set forth in Example I and the sodium borohydride was recovered in a 36 percent yield.

Example VI

Desiccated borax (27.1 parts) was mixed in a ball mill with 20.3 parts of sodium and 8.6 parts of silicon. The ball mill was then pressured to 50 p.s.i. with hydrogen and the temperature was raised to 600° C. with mixing and grinding for 2 hours. The reaction mixture was separated in the same manner as set forth in Example I, and the sodium borohydride was obtained in a 20 percent yield.

Similar excellent results are obtained when the reaction mixture is treated with other selective solvents such as liquid ammonia, ethylene diamine, dimethyl formamide, n-propyl amine, isopropylamine, n-butyl amine, dimethyl sulfoxide and the like.

Example VII

Desiccated borax (27 parts) was mixed in a ball mill with 23.1 parts of sodium and 18.9 parts of silicon (100 percent excess). The ball mill was then pressured to 200 p.s.i. at 200° C. with hydrogen, and the temperature raised to 500° C. with mixing and grinding for a period of 3 hours. The resulting mixture was separated by the same method as set forth in Example I. The sodium borohydride was recovered as an etherate in an 80 percent yield.

When ferrosilicon of an average particle size less than 5 microns is substituted for silicon in the above procedure and the reaction is conducted at 15 p.s.i. and 350° C. for a period of 24 hours, similar results are obtained.

Example VIII

Desiccated borax (27 parts) was mixed in a ball mill with 20 parts of sodium and 14.1 parts of silicon (50 percent excess). The ball mill was then pressured to 200 p.s.i. at 200° C. with hydrogen and the temperature raised to 500° C. with mixing and grinding for a period of 3 hours. The resulting mixture was then separated by the same method as set forth in Example I. The sodium boro-hydride was recovered as an etherate in a 48 percent yield.

Example IX

Desiccated borax (27 parts) was mixed in a ball mill with 20 parts of sodium and 18.9 parts of silicon (100 percent excess). The ball mill was then pressured to 200 p.s.i. at 200° C. with hydrogen and the temperature raised to 500° C. with mixing and grinding for a period of 4 hours. The resulting mixture was separated by the same method as set forth in Example I. The sodium borohydride was recovered as an etherate in a 68 percent yield.

Example X

The process of Example VII is repeated except that it is conducted in the presence of lead diluent.

Example XI

The process of Example VII is repeated except that the sodium is introduced in the form of lead-sodium alloy and the temperature raised gradually to produce progressive melting of the alloy.

Example XII

Employing the apparatus of Example I, 46 parts of desiccated borax was mixed in a ball mill with 40 parts (16 percent excess) of sodium and 30 (100 percent excess) of silicon. The ball mill was then pressured to 500 p.s.i. with hydrogen and the temperature raised to 500° C. The reactants were mixed and ground for a period of 3 hours and thereafter cooled. The resulting reaction mixture was separated by solubilizing the $NaBH_4$ in dimethyl ether of diethylene glycol. The solution was then filtered to remove impurities. The resulting product solution was diluted to standard volume in a volumetric flask and the $NaBH_4$ concentration measured by infrared analysis. A yield of 77 percent $NaBH_4$ was obtained.

When the above example is repeated, using liquid ammonia instead of the dimethyl ether of diethylene glycol to extract the $NaBH_4$ from the reaction mixture and the $NaBH_4$ is recovered from the $NaBH_4$-ammonia solution by evaporating the ammonia, or by diluting with isopropyl alcohol and then evaporating the ammonia, essentially pure crystalline $NaBH_4$ is recovered in similar yield.

Example XIII

The same apparatus and procedure of Example XII was employed except that the temperature in this run was 550° C. Sodium borohydride (etherate) was realized in 79 percent yield.

Example XIV

Employing the apparatus of Example I, 46 parts of desiccated borax was mixed in a ball mill with 52 parts (50 percent excess) of sodium and 22 parts (50 percent excess) of silicon. The ball mill was sealed and pressured to 500 p.s.i. with hydrogen and then heated to a temperature of 450° C. The reactants were mixed and ground under these conditions for a period of 5 hours and thereafter cooled. The resulting reaction mixture was separated by solubilizing the $NaBH_4$ in dimethyl ether of diethylene glycol. This solution was then filtered to remove impurities. The resulting product solution was diluted to standard volume in a volumetric flask and the $NaBH_4$ concentration measured by infrared analysis. A yield of 83 percent was obtained.

When the above example is repeated, using liquid ammonia instead of the dimethyl ether of diethylene glycol to extract the $NaBH_4$ from the reaction mixture and the $NaBH_4$ is recovered from the $NaBH_4$-ammonia solution by evaporating the ammonia, or by diluting with isopropyl alcohol and then evaporating the ammonia, essentially pure crystalline $NaBH_4$ is recovered in similar yield.

When the above conditions are duplicated, except that a pressure of 2000 p.s.i. is employed, similar results are realized in about 3.5 hours.

Example XV

The same apparatus and procedure employed in Example XIV above was employed in this run except that the temperature was 400° C. and the pressure 50 p.s.i. Sodium borohydride (etherate) was realized in 77 percent yield.

Equally good results are obtained when potassium is employed in place of sodium in the above procedure to produce potassium borohydride.

Example XVI

Under non-oxidizing conditions, a previously purged autoclave equipped with baffles and turbine type stirrers was charged with 592 parts of desiccated borax, 692 parts sodium, and 300 parts of silicon having an average particle size less than 5 microns. Mineral oil of a quantity to constitute 85 percent on a weight basis was added to the reaction mass. The autoclave was then sealed and purged with hydrogen. While the reaction mass was being slurried, the temperature of the autoclave was raised to 435° C. and the pressure was adjusted to about 500 p.s.i. Mixing was continued under these conditions for about 15 minutes after which the autoclave was allowed to cool. Upon cooling, the autoclave was vented and the reaction mass removed. The reaction mass was then separated from the bulk of the mineral oil by filtration followed by washing with petroleum ether to remove residual mineral oil. The reaction mass was then washed with dimethyl ether of dethylene glycol to solubilize the end product sodium borohydride. An infrared analysis was run on the resulting solution which was found to contain sodium borohydride realized in 88 percent yield.

When the above reactants are first comminuted to an average particle size less than 50 microns and then reacted at 900 p.s.i. and 575° C., sodium borohydride is recovered in good yield.

The substitution of lithium, potassium, rubidium, or cesium for sodium in the above procedure produces the corresponding borohydride in good yield.

Example XVII

In this run, which was similar to Example XVI above, 595 parts of desiccated borax, 700 parts sodium, and 300 parts of silicon having an average particle size less than 10 microns were reacted in a mineral oil diluent at 425° C. and 500 p.s.i. After 1 hour, the resultant product solution was analyzed and found to contain sodium borohydride in 95 percent yield.

Substitution of sodium hydride for sodium, ulexite for borax, and ferrosilicon for silicon in the above reaction utilizing pentadecane as a diluent on a 75 percent weight basis, produces similar results in a reaction period of 20 minutes at 600 p.s.i. and 350° C.

Example XVIII

To a previously purged autoclave equipped with baffles and turbine type stirrers and under non-oxidizing conditions was added 75 parts of desiccated borax, 84 parts (50 percent excess) sodium, and 36 parts (50 percent excess) of silicon having an average particle size less than 10 microns. White mineral oil of a quantity to constitute 85 percent on a weight basis was added to the reactants. The autoclave was then sealed and pressured with hydrogen. While the reaction mass was being slurried, the temperature of the autoclave was raised to 435° C. and the pressure was adjusted to about 500 p.s.i. and mixing continued for about 1 hour. The autoclave was allowed to cool whereafter it was vented and the reaction mass removed. The reaction mass was then separated from the bulk of the mineral oil by filtration followed by washing with petroleum ether to remove residual mineral oil. The reaction mass was then washed with dimethyl ether of diethylene glycol to solubilize the end product sodium borohydride. Infrared analysis of the resultant reaction solution showed that sodium borohydride was realized in 92 percent yield.

Example XIX

Employing the same procedure as in Example XVIII above, potassium hydride, borax, and silicon having an average particle size less than 3 microns when slurried in xenylamine as a diluent on a 95 percent weight basis and subjected to 950 p.s.i. at 375° C. for a reaction period of 30 minutes, produces potassium borohydride in similar yield.

The alkali metal borohydride can be recovered from the reaction mixture by solubilizing the alkali metal borohydride in a solvent selective for the alkali metal borohydride. Such selective solvents include amines, ethers, sulfur derivatives, phosphines and the like. The selective solvents generally employed are liquid ammonia (which includes ammonia-alcohol mixtures), the dimethyl ether of diethylene glycol, ethylene diamine, dimethyl sulfoxide, and the like.

After the alkali metal borohydride is solubilized, the mixture is then subjected to standard work-up procedures, e.g., filtration, decantation, centrifugation, or the like, to remove impurities, followed by recovery of the borohydride from the solution.

Exemplary of suitable diluents for use in the instant invention are: decane, dodecane, pentadecane, octadecane, eicosane, pentacosane, triacontane, pentatriacontane, tetracontane, octatetracontane, pentatetracontane, hexacontane, and mixtures thereof, e.g. mineral oil and the like. Other diluents are: biphenyl, dibenzyl, stilbene, silicone fluids, molten metals (such as lead), suitable salts, and the like. In the case of lead the introduction of sodium as an alloy with lead is advantageous. In such instances the alloy is slowly added to a reaction mass maintained above the alloy melting point, or can be added to a mass at a lower temperature and the mass gradually raised in temperature to produce controlled melting and hence controlled reaction rate.

The alkali metal borohydride produced by the process of this invention may be put to a wide variety of uses. For example, U.S. Patent 2,991,152 describes using potassium borohydride in reducing bisulfites to produce the potassium salts of hydrosulfurous acid. This type of reaction is valuble in vat dyeing operations.

Sodium borohydride may be used as a photographic chemical to give a clean-up effect providing an improved photographic reproduction. This is found in Patent 2,964,567. Sodium borohydride, as well as other alkali metal borohydrides, may be used for the reduction of esters. Still another use for the alkali metal borohydrides is hair waving, which is disclosed in Patent 2,766,760. Sodium borohydride may also be employed for bleaching wood pulp in combination with such bleaching agents as chlorine dioxide.

Having thus described the process of this invention, it is not intended that it be limited except as set forth in the following claims.

What is claimed is:

1. A process for the production of an alkali metal borohydride which comprises reacting together, at a temperature ranging from about 250° C. to about 600° C. and at a pressure from about 15 p.s.i. to about 500 p.s.i., an alkali metal, hydrogen, desiccated borax and silicon, said silicon having an average particle size less than about 5 microns, in an inert hydrocarbon diluent which is a liquid at the reaction temperature employed.

2. The process of claim 1 wherein said alkali metal hydride is sodium hydride and the silicon is present in an excess above the stoichiometric amount.

3. The process of claim 1, wherein said temperature is within the range of from about 350° C. to about 500° C.

4. A process for the production of an alkali metal borohydride which comprises agitating together an alkali metal hydride, hydrogen, dessicated borax, and silicon in a mineral oil diluent at a temperature within the range of from about 400 to about 450° C. and at a pressure within the range of from about 300 to about 600 p.s.i., said alkali metal hydride and desiccated borax reactants having an average particle size less than about 5 microns, said mineral oil diluent being liquid at the conditions employed and present in an amount within the range of from about 65 to 95 percent on a weight basis.

5. The process of claim 4 wherein said alkali metal hydride is sodium hydride.

6. A process for the production of sodium borohydride which process comprises heating to a temperature of from about 400 to about 450° C. and at a pressure within the range of from about 300 to about 600 p.s.i. a constantly agitated mixture of sodium, anhydrous borax, and silicon in an inert mineral oil diluent under an atmosphere of hydrogen, said sodium and anhydrous borax reactants having an average particle size less than about 50 microns, said silicon reactant having an average particle size less than about 5 microns, said sodium, silicon, and hydrogen reactants being present in excess of stoichiometric proportions, and said mineral oil diluent being liquid at the conditions employed and present in an amount within the range of from about 65 to 95 percent on a weight basis.

References Cited

UNITED STATES PATENTS

| 1,896,986 | 2/1933 | Tillmann | 23—1 X |
| 3,077,376 | 2/1963 | Shubert et al. | 23—361 |
| 3,164,441 | 1/1965 | Goerrig | 23—361 |
| 3,259,474 | 7/1966 | Broja et al. | 23—361 |

FOREIGN PATENTS 774,728   5/1957   Great Britain.

OTHER REFERENCES

Babor, J. A., et al.: General College Chemistry; Thomas J. Crowell Co., N.Y., 1940, page 66.

OSCAR R. VERTIZ, Primary Examiner

G. O. PETERS, Assistant Examiner

PO-1050
(5/69)

UNITED STATES PATENT OFFICE
CERTIFICATE OF CORRECTION

Patent No. 3,459,514          Dated August 5, 1969.

Inventor(s) James D. Johnston and Albert P. Giraitis

It is certified that error appears in the above-identified patent and that said Letters Patent are hereby corrected as shown below:

Column 3, line 37, reads "is", should read -- in -- . Column 4, lines 40 and 41 should be reversed; line 61, reads "mil", should read -- mill -- . Column 5, line 11, reads "poducts", should read -- products -- . Column 6, line 17, reads "pressurized", should read -- pressured -- . Column 8, line 14, reads "dethylene", should read -- diethylene -- .

SIGNED AND
SEALED
APR 7 1970

(SEAL)
Attest:

Edward M. Fletcher, Jr.
Attesting Officer

WILLIAM E. SCHUYLER, JR.
Commissioner of Patents